US012615506B2

(12) United States Patent
Arbuzov et al.

(10) Patent No.: US 12,615,506 B2
(45) Date of Patent: Apr. 28, 2026

(54) PROVIDING WIRELESS SERVICES BASED ON USING SUBSCRIBER GEOSPATIAL ACTIVITY

(71) Applicant: DISH Network L.L.C., Englewood, CO (US)

(72) Inventors: Mikhail Arbuzov, Santa Clara, CA (US); Sisong Bei, Dublin, CA (US); Dmitry Dimov, San Francisco, CA (US)

(73) Assignee: DISH Network L.L.C., Englewood, CO (US)

( * ) Notice: Subject to any disclaimer, the term of this patent is extended or adjusted under 35 U.S.C. 154(b) by 293 days.

(21) Appl. No.: 18/535,633

(22) Filed: Dec. 11, 2023

(65) Prior Publication Data

US 2025/0193656 A1    Jun. 12, 2025

(51) Int. Cl.
*H04W 8/18* (2009.01)
*H04W 4/50* (2018.01)
(52) U.S. Cl.
CPC ............. *H04W 8/186* (2013.01); *H04W 4/50* (2018.02)
(58) Field of Classification Search
CPC ............................... H04W 8/186; H04W 4/50
See application file for complete search history.

(56) References Cited

U.S. PATENT DOCUMENTS 9,154,362 B1 * 10/2015 Oakenfull ................ G06N 5/02
2022/0044244 A1 * 2/2022 Chen .................... G06Q 20/405

2022/0415146 A1 * 12/2022 Albero ............... G08B 13/1609
2024/0119313 A1 * 4/2024 Whang .................. G06N 3/045
2024/0185137 A1 * 6/2024 Atlan ...................... G06F 40/58
2025/0061341 A1 * 2/2025 Mondal .................. G06N 3/096
2025/0117649 A1 * 4/2025 Ghosh ...................... G06N 3/08

OTHER PUBLICATIONS

Dmitry Dimov et al., "System and Method for Delivering Customized Promotions to Reduce Churn of Television Users," U.S. Appl. No. 18/535,696, filed Dec. 11, 2023. (33 Pages).
Mikhail Arbuzov et al., "System and Method for Reducing Subscriber Churn Through Complimentary Data Allocations," U.S. Appl. No. 18/540,588, filed Dec. 14, 2023. (27 Pages).

* cited by examiner

*Primary Examiner* — Raymond S Dean
(74) *Attorney, Agent, or Firm* — Jeremiah J. Baunach; Frontier IP Law PLLC

(57) ABSTRACT

Described herein are systems, methods, and media for classifying subscribers of a wireless network based on their geospatial activity for customized promotions. In an embodiment, a method of classifying subscribers based on their geospatial activity includes creating an augmented graph for each subscriber of a plurality of subscribers of the wireless network based on their respective geospatial activity; and extracting, using a first machine learning model, a plurality of features from the respective augmented graph of each subscriber of the plurality of subscribers. The method further includes creating an embedding for the respective plurality of features of each subscriber of the plurality of subscribers; and classifying, using a second machine learning model, the plurality of subscribers into a plurality of groups of subscribers based on the respective embedding of each subscriber of the plurality of subscribers.

20 Claims, 7 Drawing Sheets

100

Wireless Network  103

Subscriber Classifier  135

Customized promotion Component  137

Embedding N  111

Embedding B  109

Embedding A  107

Subscriber Feature Extractor  105

CDR Database  104

Subscriber Database  101

```
[
401   // Subscriber Node
      // - Basic subscriber information (if available)
      // ...

403   // Cell Tower Nodes
      // - Tower ID
      1,
      // - Technical specifications
      [0.5, 1.0],
      // - Other metadata
      3,
      // - Thickness of line from subscriber to cell tower (frequency or duration of calls)
      0.8, 405   // Geographic Nodes
      // - Median income
      0.7,
      // - Average house values
      0.4,
      // - Other relevant socio-economic metrics
      0.6,
]
```

FIGURE 4

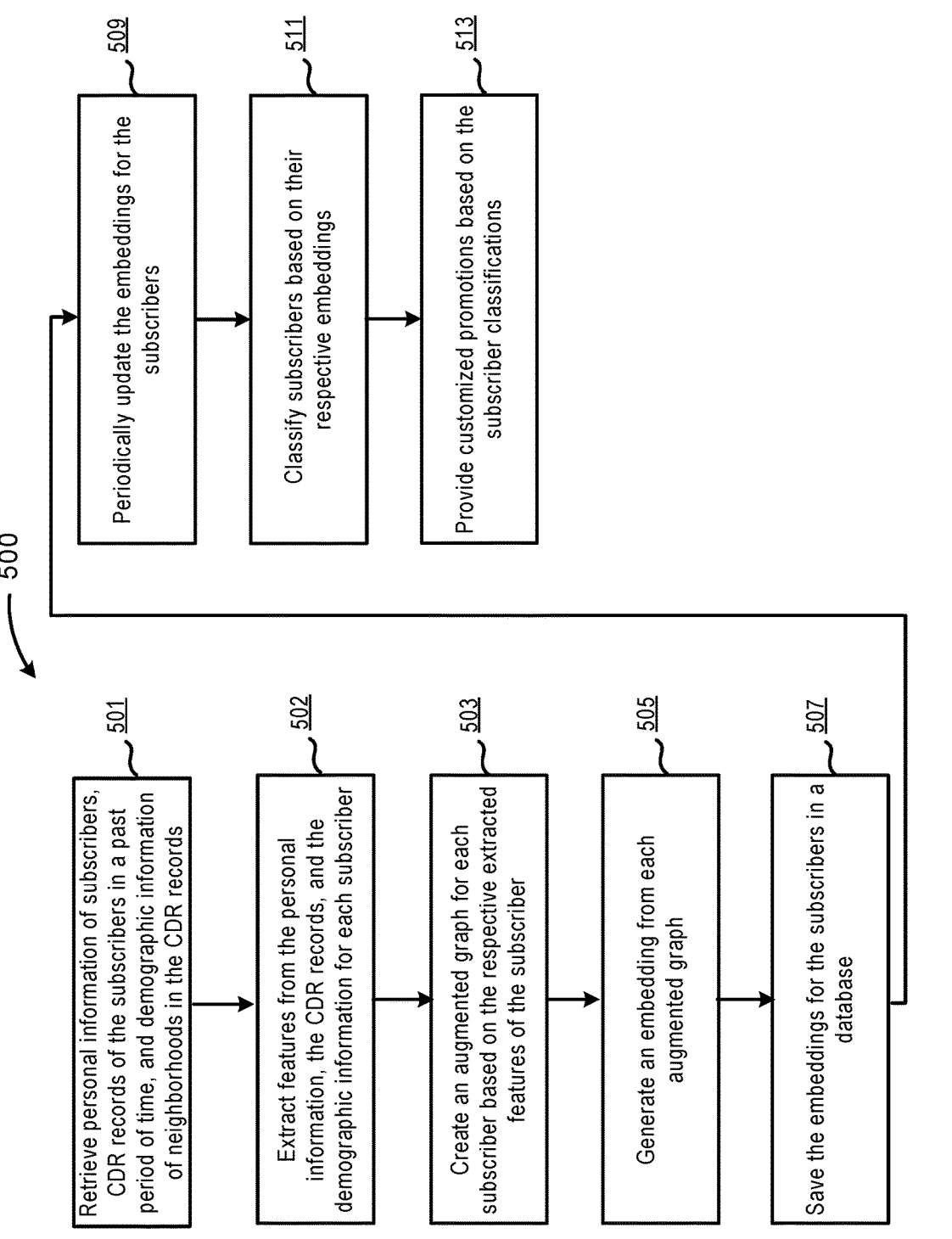

500

509
Periodically update the embeddings for the subscribers

511
Classify subscribers based on their respective embeddings

513
Provide customized promotions based on the subscriber classifications

501
Retrieve personal information of subscribers, CDR records of the subscribers in a past period of time, and demographic information of neighborhoods in the CDR records 502
Extract features from the personal information, the CDR records, and the demographic information for each subscriber 503
Create an augmented graph for each subscriber based on the respective extracted features of the subscriber 505
Generate an embedding from each augmented graph 507
Save the embeddings for the subscribers in a database

FIGURE 5

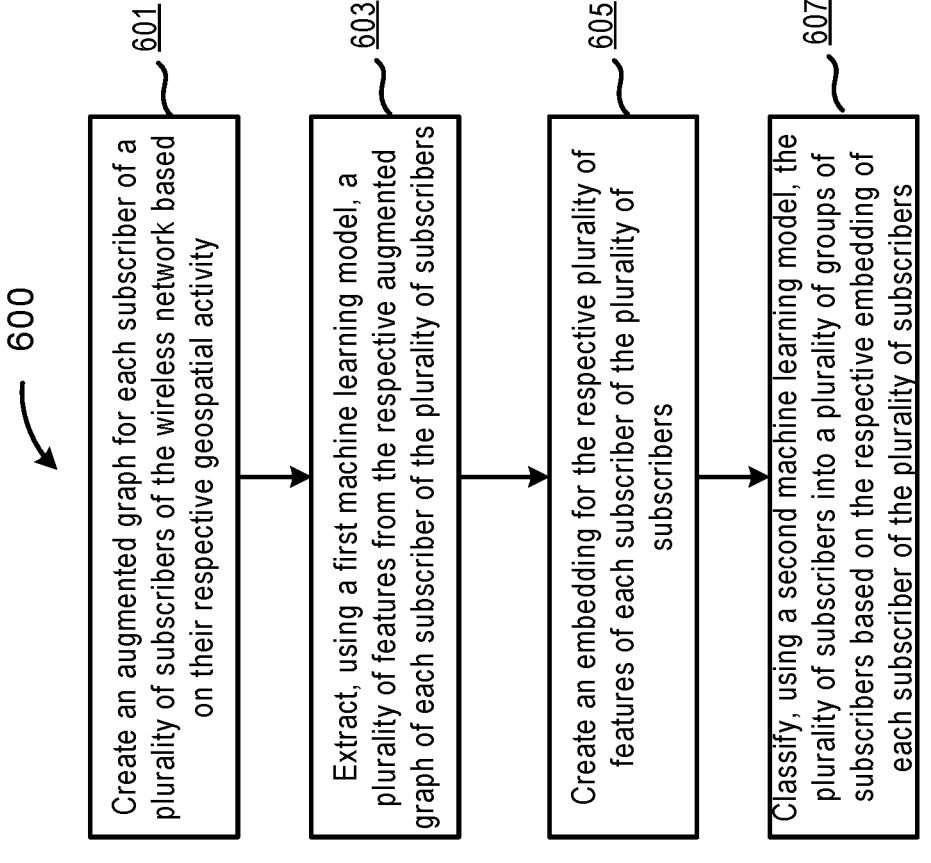

600

601

Create an augmented graph for each subscriber of a plurality of subscribers of the wireless network based on their respective geospatial activity

603

Extract, using a first machine learning model, a plurality of features from the respective augmented graph of each subscriber of the plurality of subscribers

605

Create an embedding for the respective plurality of features of each subscriber of the plurality of subscribers

607

Classify, using a second machine learning model, the plurality of subscribers into a plurality of groups of subscribers based on the respective embedding of each subscriber of the plurality of subscribers

FIGURE 6

PROVIDING WIRELESS SERVICES BASED ON USING SUBSCRIBER GEOSPATIAL ACTIVITY

TECHNICAL FIELD

The present disclosure relates generally to subscriber classification techniques within wireless network systems, and more specifically relates to the use of geospatial activity to classify subscribers for promotion customizations in providing wireless services.

BRIEF SUMMARY

For decades, wireless network providers have depended on subscriber data to refine services and customize promotions to subscribers. This data often includes credit history and detailed usage patterns. However, there are instances where network providers lack comprehensive data for specific subscriber categories. For instance, pre-paid subscribers largely remain anonymous, depriving network providers of their credit background and in-depth personal details. Additionally, new subscribers present another challenge, as their limited historical data makes it challenging for providers to discern meaningful behavioral patterns.

Described herein are systems, methods, and media for classifying subscribers of a wireless network based on their geospatial activity for customized promotions. In an embodiment, a method of classifying subscribers based on their geospatial activity includes creating an augmented graph for each subscriber of a plurality of subscribers of the wireless network based on their respective geospatial activity; and extracting, using a first machine learning model, a plurality of features from the respective augmented graph of each subscriber of the plurality of subscribers. The method further includes creating an embedding for the respective plurality of features of each subscriber of the plurality of subscribers; and classifying, using a second machine learning model, the plurality of subscribers into a plurality of groups of subscribers based on the respective embedding of each subscriber of the plurality of subscribers.

In some embodiments of the method, the method further includes saving the respective embedding of each subscriber of the plurality of subscribers in a database.

In some embodiments of the method, the respective embedding of each subscriber of the plurality of subscribers is periodically updated.

In some embodiments of the method, the geospatial activity is derived from call detail records of each subscriber of the plurality of subscribers.

In some embodiments of the method, the geospatial activity includes at least the following: a cell tower ID that handles each call, a start time and an end time of the call, a call type, and a data volume consumed by the call.

In some embodiments of the method, each of the first machine learning model and the second machine learning model is a deep learning model.

In some embodiments of the method, the augmented graph for each subscriber of the plurality of subscribers includes a node for the subscriber, a node for each cell tower from which the subscriber made a call, and a geographic node where the cell tower is located. The thickness of an edge between the node for the subscriber and the respective node for each cell tower is proportional to the frequency or duration of calls made by the subscriber via the respective cell tower.

In some embodiments of the method, the respective geospatial activity of each subscriber of the plurality of subscribers is derived from call detail records over a predetermined period of time of the subscriber.

According to other embodiments, the methods can be implemented by a system and/or a computer readable storage medium as described herein.

In an embodiment, the system can be a multi-node cloud system, where the operations for classifying subscribers can be distributed across multiple processing nodes to increase the system's scalability, fault tolerance, and performance in terms of processing speed of the system. Further, data related to the operations can be loaded into a distributed shared memory (DSM) to be accessed by multiple processing nodes. The DSM enhances the system's scalability since it allows more processing nodes to be added as more processing power is needed. As the system expands, it offers increased memory resources to the applications, boosting overall performance. Further, the DSM facilitates the efficient use of memory resources spread across different machines. If a node is grappling with high memory consumption, it has the capability to tap into the unused memory of other nodes, enhancing the adaptability of the cloud-based computing system.

As shown above and in more detail throughout the disclosure, various embodiments of the disclosure provide technical improvements over existing systems for classifying subscribers of a wireless network. These and other features and advantages of the disclosure will become more readily apparent in view of the embodiments described herein and illustrated in this specification.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings:

FIG. 4 is an example of an embedding for a subscriber generated from a corresponding augmented graph for the subscriber according to an embodiment of the disclosure.

FIG. 5 is a block diagram illustrating a process of classifying subscribers according to an embodiment of the disclosure.

FIG. 6 is a block diagram illustrating another process of classifying subscribers according to an embodiment of the disclosure.

DETAILED DESCRIPTION

The following description, along with the accompanying drawings, sets forth certain specific details in order to provide a thorough understanding of various disclosed embodiments. However, one skilled in the relevant art will recognize that the disclosed embodiments can be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments can be methods, systems, media, or devices. Accordingly, the various embodiments can be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "In some embodiments of the method," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
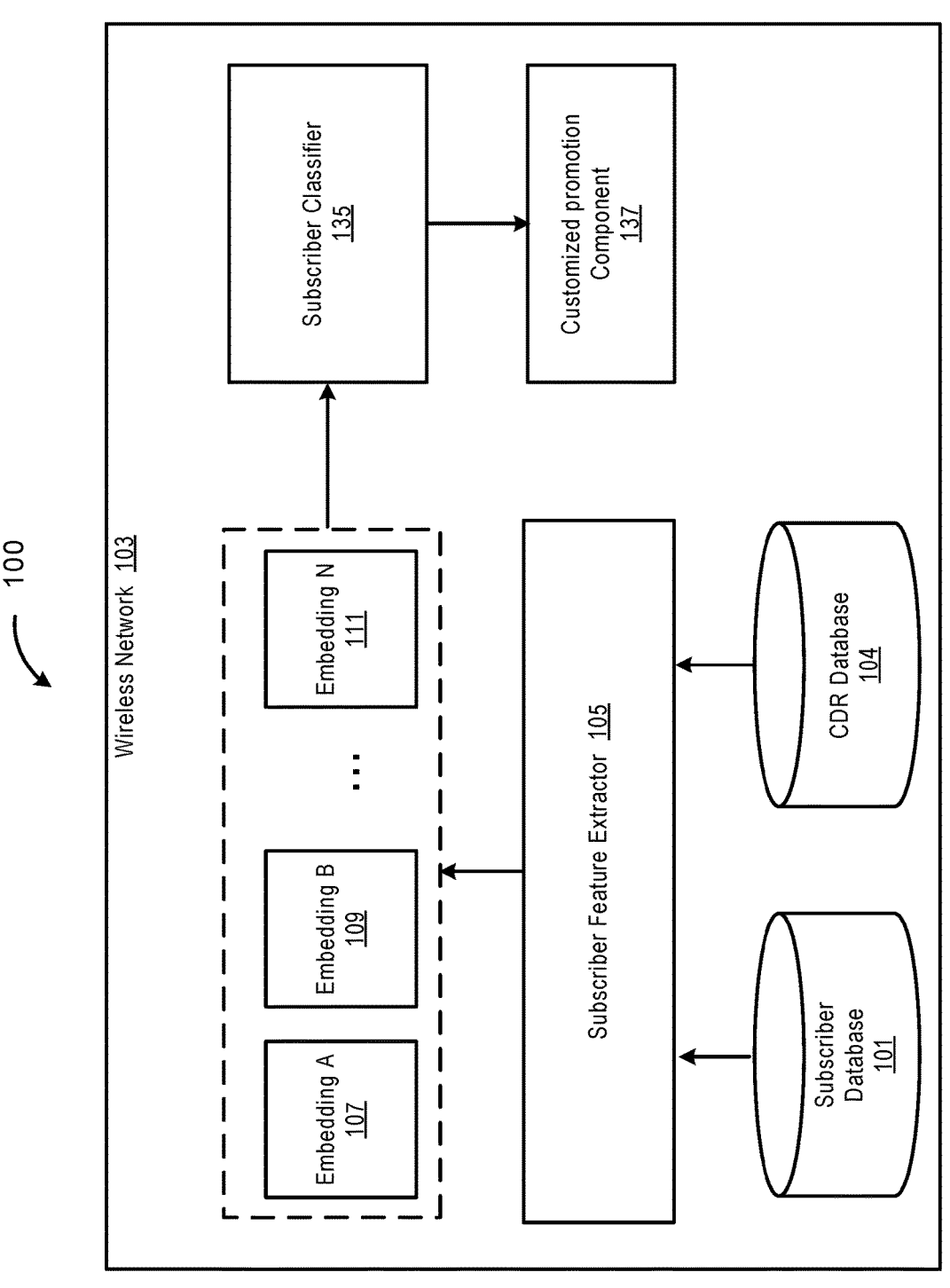
FIG. 1 is a block diagram illustrating a system for classifying uses of a wireless network according to an embodiment of the disclosure.

FIG. 1 is a block diagram illustrating a system 100 for classifying uses of a wireless network 103 according to an embodiment of the disclosure. The system 100 includes a subscriber feature extractor 105 configured to extract features from a subscriber database 101 and a CDR database 104. As used herein, a subscriber can be a post-paid subscriber or pre-paid subscriber of the wireless network 103.

In an embodiment, the subscriber database 101 can include individual subscriber profiles, including raw data such as subscriber IDs, device information, subscription types, and billing information. Further, the subscriber database 101 can include an average income and an average housing price of the neighborhood where the subscriber lives. The CDR database 104 includes call detail records for each subscriber. These records can include granular details—timestamps, call durations, cell tower connections, and geospatial data indicating the subscriber's physical location during each call.

Features can be extracted by the subscriber feature extractor 105 from the subscriber database 101 and the CDR database 104. These extracted features for each subscriber can include, but not limited to, duration of each call, a date and time the call was made, a location of the call, and a recipient number of the call as well as a median income and a median housing value of a neighborhood where the caller lives. The features for each subscriber can be represented on an augmented graph, from which an embedding can be created.

In FIG. 1, embedding A 107 is created from an augmented graph representing features of subscriber A extracted from the subscriber database 101 and the CDR database 104; embedding B 109 is created from an augmented graph representing features of subscriber B extracted from the subscriber database 101 and the CDR database 104; embedding N 111 is created from an augmented graph representing features of subscriber N extracted from the subscriber database 101 and the CDR database 104. Each of the embeddings 107-111 is a compact, continuous vector representation of a subscriber within the wireless network. This representation captures multidimensional aspects of the subscriber's attributes and behaviors, converting them into a numerical form that is conducive to computational processing and analysis.

In an embodiment, each of the embeddings 107-111 can encode geospatial activities of a subscriber, representing patterns of movement, frequent locations, and interactions with network cell towers. By reducing these spatial and temporal interactions into a vector format, the embedding can represent how a subscriber moves and uses the network over time. Further, the embedding can integrate demographic data, such as age group, income bracket, or other relevant categories. This integration allows for a more holistic view of the subscriber, providing a context for the behavioral patterns detected from the geospatial activities of the subscriber.

Despite the vast and varied nature of the original data, the embedding compresses this information into a fixed number of dimensions. Each dimension in the vector captures specific variations or patterns in the subscriber's data, ensuring a dense and information-rich representation. Thus, each of the embeddings 107-111 serves as a numerical fingerprint for each subscriber, capturing their unique geospatial activities and demographic traits in a format amenable to sophisticated computational analyses. Further, by translating discrete and high-dimensional subscriber data into continuous vector space, embeddings facilitate advanced computational operations, from similarity measurements between subscribers to input for machine learning models.

As an example, a subscriber classifier 135 can use a trained machine learning model to classify subscribers of the wireless network 103 into different groups based on their respective embeddings. The different groups may reflect subscriber behaviors, value tiers, or potential churn probabilities. Once the subscribers are classified into different groups, a customized promotion component 137 can be used to provide customized promotions to the different groups.

Figure 2:
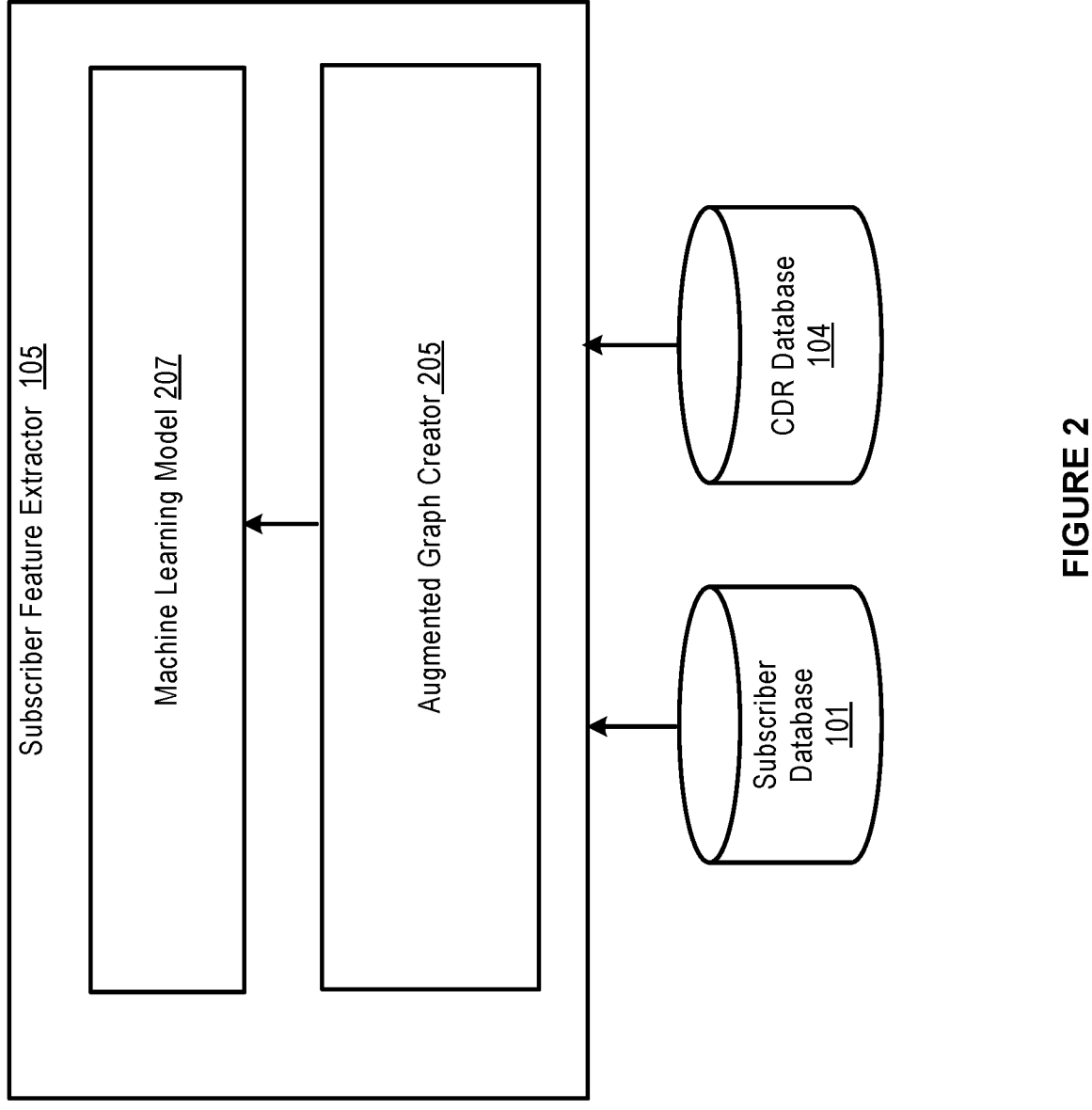
FIG. 2 is a block diagram further illustrating the subscriber feature extractor component according to an embodiment of the disclosure.

FIG. 2 is a block diagram further illustrating the subscriber feature extractor 105 according to an embodiment of the disclosure. The subscriber feature extractor 105 includes an augmented graph creator 205 and a machine learning model 207. The augmented graph creator 205 can create an augmented graph for each subscriber based on the subscriber's data in the subscriber database 101 and the CDR database 104. The machine learning model 207 can be a deep learning model that is trained to learn embeddings from the augmented graphs.

In an embodiment, the augmented graph creator 205 can retrieve features of each subscriber from the subscriber database 101 and the CDR database 104. As described above, the subscriber database 101 can contain information for each subscriber, for example, their name, address, phone number, and subscription plan. The CDR database 104 can contain call detail records (CDRs) for the wireless network's subscribers, such as the time, date, and location of each call. The augmented graph creator 205 can retrieve these features from CDR records in a past period of time (e.g., 3 months).

In an embodiment, a variety of tools and techniques can be used to extract the relevant features from the subscriber database 101 and the CDR database 104. For example, a SQL query can be used to extract the subscriber's name, address, phone number, and subscription plan from the subscriber database 101. Additionally, a data science tool, such as Python or R, can be used to extract the demographic data of the neighborhoods where the subscriber made calls from a public source, such as the U.S. Census Bureau. Similarly, a SQL query can be used to retrieve raw CDR data from the CDR database 104.

Further, the augmented graph creator 205 can identify all calls made by the subscriber by filtering out the CDR data based on the subscriber's phone number, and then extract the duration of each call by calculating the difference between the start time and end time of each call. The location of each call can be determined using the cell tower ID from the CDR record. Each CDR record includes a cell tower ID, from which a geographic location (latitude and longitude) of the cell tower can be determined by referencing another database that includes mapping entries between cell tower IDs and their locations.

Once all the relevant features have been extracted, a variety of graph libraries and tools can be used to create an augmented graph for each subscriber. In one embodiment, a node for the subscriber can be created first, and then edges between the node and other entities can be added. Examples of the other entities include the subscriber's home location, frequently visited locations, locations where the subscriber made calls, and demographic data of the neighborhoods where the subscriber made calls. The edges can be weighted to represent the strength of the relationship between the subscriber and the other entities. For example, a higher weight can be given to the edge between the subscriber and their home location than the edge between the subscriber and a location where they only made a single call, because they made more calls from their home location than from the other location.

The graph created for each subscriber can be augmented with demographic data. This can be done by adding extracted features from a demographic database to the node and edges of the graph. For example, the subscriber's demographic information (such as age, gender, income, and education level) to the subscriber node. Further, when a subscriber's personal demographic data is not available, the demographic data of the neighborhoods where the subscriber made calls can be added to the edges between the subscriber node and the corresponding location nodes. For instance, a subscriber's personal demographic data may not be available if the subscriber is a pre-paid subscriber.

Once the graph has been augmented, it can be used as input to the machine learning model 207, which has been trained to learn embeddings from the augmented graph. Embeddings are representations of data that capture complex relationships between different data points. In this case, the embeddings capture the geospatial data and demographic data of the subscribers, as well as their relationships with each other. The embeddings generated by the machine learning model 207 are then used as input to a trained machine learning model to classify subscribers into different groups.

In an embodiment, the machine learning model 207 can implement one of many graph embedding algorithms for converting graphs into embeddings. Examples of the graph embedding algorithms include Node2Vec, DeepWalk, GraphSAGE, and Graph Convolutional Network (GCN).

Regardless of which machine learning model to use, the following steps are performed in generating the embeddings from the augmented graphs. The first step is to represent the augmented graphs in a computational format using a variety of graph libraries, such as NetworkX in Python. Once the graphs have been represented in a computational format, the next step is to select one of the above-mentioned graph embedding algorithms. Once an embedding technique has been selected, the next step is to preprocess the graphs. This may involve removing outliers, converting categorical data to numerical data, and scaling the data to a common range. The goal of preprocessing is to ensure that the data is in a format that can be processed by the selected embedding algorithm. The next step is to train the embedding model on the preprocessed graphs. This process generates an embedding for each subscriber based on their respective graph. Once the embedding model has been trained, the next step is to evaluate the embeddings by comparing the embeddings to known ground truth data. The goal of evaluation is to ensure that the embeddings are of high quality and can be used effectively for the intended task. The final step is to store the embeddings in a database, a file system, or a cloud storage service.

Figure 3:
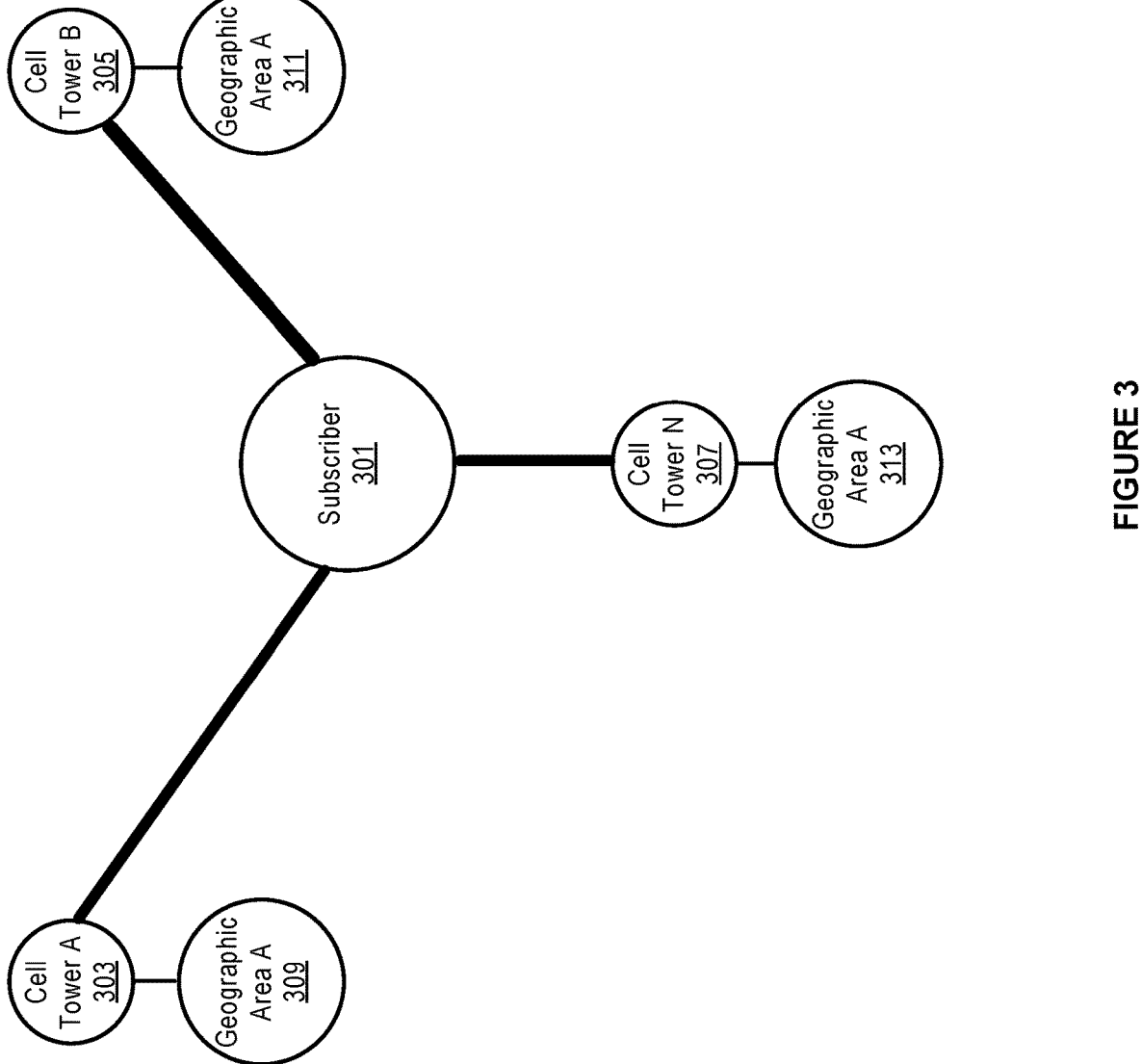
FIG. 3 is an example of an augmented graph for a subscriber according to an embodiment of the disclosure.

FIG. 3 is an example of an augmented graph for a subscriber according to an embodiment of the disclosure. As shown, the example augmented graph includes a subscriber node 301, which is a primary node representing the subscriber and serves as the focal point of the graph. Additionally, the graph includes a plurality of cell tower nodes 303-307, each representing a tower that the subscriber's phone connected to during calls or other activities during a past period of time (e.g., three months). Further, the augmented graph includes a plurality of geographic nodes 309-313 that are connected to their respective cell tower nodes 303-307. Each of the geographic nodes 309-313 represents a neighborhood or region that tower is located in. This region or neighborhood may have public demographic data (e.g., median or average housing price, median income, etc.) that provide additional context for the augmented graph for the subscriber.

In an embodiment, edges between the subscriber node 301 and each of the cell tower node 303-307 vary in thickness. The thickness of each edge can be proportional to the frequency or duration of calls routed through that tower.

Further, each node can have one or more attributes. For example, the subscriber node 301 can be annotated with any available basic information about the subscriber. In one embodiment, this information can be minimal due to privacy concerns or the subscriber being a pre-paid subscriber. Attributes for each of the cell tower nodes 303-307 can include a tower ID, technical specifications, or other metadata about the tower. Attributes about each of the geographic nodes can include a median income, an average house value, and other relevant socio-economic metrics for the neighborhood or region.

In an embodiment, the example augmented graph graphically represents the features extracted from the databases 101 and 104, which makes it easier for a machine learning model (e.g., the machine learning model 207) to process and identify features associated with the subscriber. The augmented graph can represent relationships that are not obvious in their non-graph formats.

For example, by analyzing the subscriber's connections to different geographic nodes, patterns such as preferred regions or areas that the subscriber frequently visits may be discerned. Additionally, by examining the demographic attributes of the most frequently visited geographic node, the subscriber's potential socio-economic interactions can be inferred. For instance, if a subscriber often connects to towers in affluent areas, it might suggest that the subscriber resides in an affluent region or neighborhood. Furthermore, by analyzing the weights or thickness of edges connected to different towers, the subscriber's call habits, such as preferred times or days to make calls, or high-frequency locations, can be determined.

Therefore, by constructing and analyzing an augmented graph for each subscriber, insights into their behavior and potential preferences based on geospatial activity and the demographic context of their calls can be determined. This approach becomes particularly valuable when traditional data sources, like credit history, are unavailable.

FIG. 4 is an example of an embedding for a subscriber generated from a corresponding augmented graph for the subscriber according to an embodiment of the disclosure.

As shown, the sample embedding is a vector that represents the subscriber's interactions with cell towers, as well as their basic information (if available). The embedding can be used to train a machine learning model to classify users or predict their behavior.

More specifically, the vector has three sections 401-405, each section including information for one type of nodes. The subscriber node section 401 includes information about the subscriber. It can contain basic subscriber information, such as subscriber ID, account type, billing address, service plan, device type, and account tenure. The cell tower node section 403 includes information about the cell tower nodes that the subscriber interacts with. Each node contains information about the cell tower, such as tower ID, technical specifications, and other metadata. The thickness of the line from the subscriber node to a cell tower node can be used to represent the frequency or duration of calls to that cell tower. The geographic node section 405 includes information about the neighborhoods or regions where the cell towers are located. Each node contains demographic information about the area, such as median income, average house values, and other relevant socio-economic metrics.

The example embedding can be used to train a machine learning model to classify users or predict their behavior in a variety of ways. For example, the model can be trained to classify users based on their demographics, their spending habits, their type of device, or the type of cell towers they interact with. The model could also be trained to predict the likelihood that a user will make a long call, the likelihood that they will switch to a competitor, or the likelihood that they will need customer support.

FIG. 5 is a block diagram illustrating a process 500 of classifying subscribers according to an embodiment of the disclosure. The process 500 can be performed by a processing logic that includes software, hardware, or a combination thereof.

At step 501, the processing logic retrieves personal information of subscribers along with call detail records (CDR) within a specified timeframe and demographic data of neighborhoods linked to the CDR records. The personal information can be retrieved from a subscriber database, the CDR records can be retrieved from a CDR database, and the demographic information linked to the neighborhoods in the CDR records can be retrieved from a public source, such as the U.S. Census Bureau.

At step 502, the processing logic extracts features from the obtained personal information, the CDR records, and the demographic data for each subscriber. This extraction can be performed using a machine learning model. Examples of the features for each subscriber can include frequency/duration of calls in a past period of time (e.g., 3 months), frequently visited locations by the subscribers, times of the visits, total data consumption in the past period, where and when calls were made, and daily commute distance and directions.

At step 503, the processing logic creates an augmented graph for each subscriber based on the features extracted at step 502. This graph can represent the relationships between the subscriber and the different places that they visit. For example, the graph could include nodes for the subscriber's home, work, and favorite shopping mall, as well as edges representing the frequency with which the subscriber visits each place.

At step 505, the processing logic generates an embedding from each augmented graph. The embedding can be a vector of numbers that represents the subscribers geospatial activity as well as demographic data related to the regions of the geospatial activity. The embedding could be used to identify subscribers with similar geospatial activity patterns.

At step 507, the processing logic saves the embeddings in a database.

At step 509, the processing logic periodically updates the embeddings for the subscribers, ensuring that the data remain up-to-date and reflect the latest changes in the subscribers' geospatial activity and other features.

At step 511, the processing logic classifies subscribers based on their respective embeddings. This can be performed using a variety of machine learning techniques, such as supervised learning and unsupervised learning.

At step 513, the processing logic provides customized promotions to the subscribers based on their classifications.

FIG. 6 is a block diagram illustrating another process 600 of classifying subscribers according to an embodiment of the disclosure. The process 600 can be performed by a processing logic that includes software, hardware, or a combination thereof.

At step 601, the processing logic creates an augmented graph for each subscriber of a plurality of subscribers of the wireless network based on their respective geospatial activity.

At step 603, the processing logic extracts, using a first machine learning model, a plurality of features from the respective augmented graph of each subscriber of the plurality of subscribers.

At step 605, the processing logic creates an embedding for the respective plurality of features of each subscriber of the plurality of subscribers.

At step 607, the processing logic classifies, using a second machine learning model, the plurality of subscribers into a plurality of groups of subscribers based on the respective embedding of each subscriber of the plurality of subscribers.

The creating the augmented graph, extracting the features, creating the embedding and the classifying may be performed concurrently and/or simultaneously for each cellular subscriber of a plurality of subscribers using specialized computing systems that implement parallel processing, multiprocessing, cloud computing, virtual computing, virtual machines, AI models and/or other specialized computing techniques and processes, thus improving the speed, efficiency and quality of wireless cellular technology and the delivery of such cellular telecommunication services.

Figure 7:
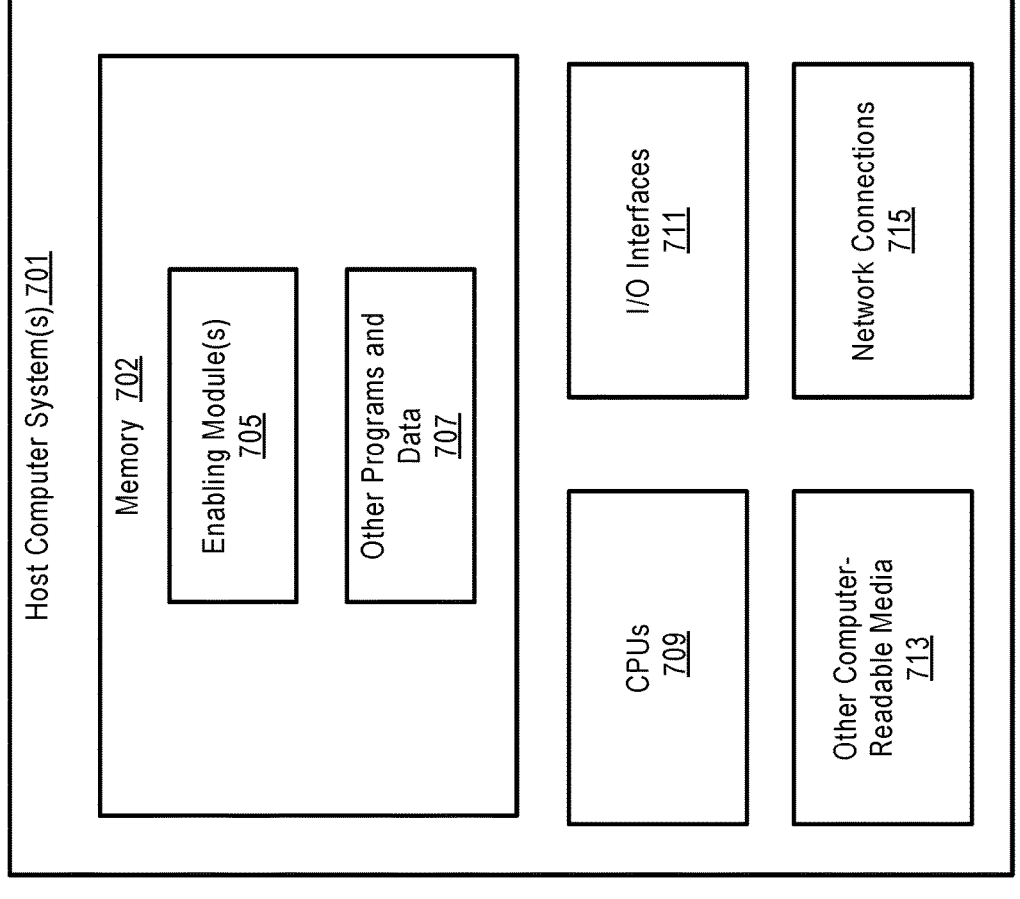
FIG. 7 shows a system diagram that describes an example implementation of a computing system(s) for implementing embodiments described herein.

FIG. 7 shows a system diagram that describes an example implementation of a computing system(s) for implementing embodiments described herein.

The functionality described herein for classifying subscribers of a wireless network based on their geospatial activities can be implemented either on dedicated hardware, as a software instance running on dedicated hardware, or as a virtualized function instantiated on an appropriate platform, e.g., a cloud infrastructure. In some embodiments of the method, such functionality can be completely software-based and designed as cloud-native, meaning that they are agnostic to the underlying cloud infrastructure, allowing higher deployment agility and flexibility. However, FIG. 7 illustrates an example of underlying hardware on which such software and functionality can be hosted and/or implemented.

In this embodiment, an example host computer system(s) 701 is used to represent one or more of those in various data centers, base stations and cell sites shown and/or described herein that are, or that host or implement the functions of: routers, components, microservices, nodes, node groups, control planes, clusters, virtual machines, network functions (NFs), intelligence layers, orchestrators and/or other aspects described herein, as applicable. In some embodiments of the method, one or more special-purpose computing systems can be used to implement the functionality described herein. Accordingly, various embodiments described herein can be implemented in software, hardware, firmware, or in some combination thereof. Host computer system(s) 701 can include memory 702, one or more central processing units (CPUs) 709, I/O interfaces 711, other computer-readable media 713, and network connections 715.

Memory 702 can include one or more various types of non-volatile (non-transitory) and/or volatile (transitory) storage technologies. Examples of memory 702 can include, but are not limited to, flash memory, hard disk drives, optical drives, solid-state drives, various types of random-access memory (RAM), various types of read-only memory (ROM), neural networks, other computer-readable storage media (also referred to as processor-readable storage media), or the like, or any combination thereof. Memory 702 can be utilized to store information, including computer-readable instructions that are utilized by CPU 709 to perform actions, including those of embodiments described herein.

Memory 702 can have stored thereon enabling module(s) 705 that can be configured to implement and/or perform some or all of the functions of the systems, components and modules described. Memory 702 can also store other programs and data 707, which can include rules, databases, application programming interfaces (APIs), software containers, nodes, pods, clusters, node groups, control planes, software defined data centers (SDDCs), microservices, virtualized environments, software platforms, cloud computing service software, network management software, network orchestrator software, intelligence layer software, network functions (NF), artificial intelligence (AI) or machine learning (ML) programs or models to perform the functionality described herein, user interfaces, operating systems, other network management functions, other NFs, etc.

Network connections 715 are configured to communicate with other computing devices to facilitate the functionality described herein. In various embodiments, the network connections 715 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 711 can include video interfaces, other data input or output interfaces, or the like. Other computer-readable media 713 can include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims but should be construed to include all possible embodiments along with the full scope of equivalents to which such claims are entitled. Accordingly, the claims are not limited by the disclosure.

What is claimed is:

1. A method of classifying subscribers of a wireless network, comprising:

creating an augmented graph for each subscriber of a plurality of subscribers of the wireless network based on their respective geospatial activity;

extracting, using a first machine learning model, a plurality of features from the respective augmented graph of each subscriber of the plurality of subscribers;

creating an embedding for the respective plurality of features of each subscriber of the plurality of subscribers; and classifying, using a second machine learning model, the plurality of subscribers into a plurality of groups of subscribers based on the respective embedding of each subscriber of the plurality of subscribers.

2. The method of claim 1, further comprising:

saving the respective embedding of each subscriber of the plurality of subscribers in a database; and providing cellular telecommunication services to the plurality of subscribers based on the classifying of the plurality of subscribers into the plurality of groups of subscribers.

3. The method of claim 2, wherein the respective embedding of each subscriber of the plurality of subscribers is periodically updated.

4. The method of claim 1, wherein the geospatial activity is derived from call detail records of each subscriber of the plurality of subscribers.

5. The method of claim 4, wherein the geospatial activity includes at least the following: a cell tower ID that handles each call, a start time and an end time of the call, a call type, and a data volume consumed by the call.

6. The method of claim 1, wherein each of the first machine learning model and the second machine learning model is a deep learning model.

7. The method of claim 1, wherein the augmented graph for each subscriber of the plurality of subscribers includes a node for the subscriber, a node for each cell tower from which the subscriber made a call, and a geographic node where the cell tower is located, and wherein a thickness of an edge between the node for the subscriber and the respective node for each cell tower is proportional to a frequency or duration of calls made by the subscriber via the respective cell tower.

8. The method of claim 1, wherein the respective geospatial activity of each subscriber of the plurality of subscribers is derived from call detail records over a predetermined period of time of the subscriber.

9. A system, comprising:

one or more processors;

one or more memories that are coupled to the one or more processors and storing program instructions for classifying subscribers of a wireless network, wherein the program instructions, when executed by the one or more processors, cause the system to perform operations comprising:

creating an augmented graph for each subscriber of a plurality of subscribers of the wireless network based on their respective geospatial activity;

extracting, using a first machine learning model, a plurality of features from the respective augmented graph of each subscriber of the plurality of subscribers;

creating an embedding for the respective plurality of features of each subscriber of the plurality of subscribers; and classifying, using a second machine learning model, the plurality of subscribers into a plurality of groups of subscribers based on the respective embedding of each subscriber of the plurality of subscribers.

10. The system of claim 9, wherein the operations further comprise:

saving the respective embedding of each subscriber of the plurality of subscribers in a database.

11. The system of claim 10, wherein the respective embedding of each subscriber of the plurality of subscribers is periodically updated.

12. The system of claim 9, wherein the geospatial activity is derived from call detail records of each subscriber of the plurality of subscribers.

13. The system of claim 12, wherein the geospatial activity includes at least the following: a cell tower ID that handles each call, a start time and an end time of the call, a call type, and a data volume consumed by the call.

14. The system of claim 9, wherein each of the first machine learning model and the second machine learning model is a deep learning model.

15. The system of claim 9, wherein the augmented graph for each subscriber of the plurality of subscribers includes a node for the subscriber, a node for each cell tower from which the subscriber made a call, and a geographic node where the cell tower is located, and wherein a thickness of an edge between the node for the subscriber and the respective node for each cell tower is proportional to a frequency or duration of calls made by the subscriber via the respective cell tower.

16. The system of claim 9, wherein the respective geospatial activity of each subscriber of the plurality of subscribers is derived from call detail records over a predetermined period of time of the subscriber.

17. A non-transitory computer readable storage medium storing program instructions for classifying subscribers of a wireless network, wherein the program instructions, when executed by one or more processors, cause the one or more processors to perform operations comprising:

creating an augmented graph for each subscriber of a plurality of subscribers of the wireless network based on their respective geospatial activity;

extracting, using a first machine learning model, a plurality of features from the respective augmented graph of each subscriber of the plurality of subscribers;

creating an embedding for the respective plurality of features of each subscriber of the plurality of subscribers; and classifying, using a second machine learning model, the plurality of subscribers into a plurality of groups of subscribers based on the respective embedding of each subscriber of the plurality of subscribers.

18. The non-transitory computer readable storage medium of claim 17, wherein the operations further comprise:

saving the respective embedding of each subscriber of the plurality of subscribers in a database.

19. The non-transitory computer readable storage medium of claim 18, wherein the respective embedding of each subscriber of the plurality of subscribers is periodically updated.

20. The non-transitory computer readable storage medium of claim 17, wherein the geospatial activity is derived from call detail records of each subscriber of the plurality of subscribers.

* * * * *